(No Model.)
J. M. MORGAN.
FILTER.
No. 489,084. Patented Jan. 3, 1893.
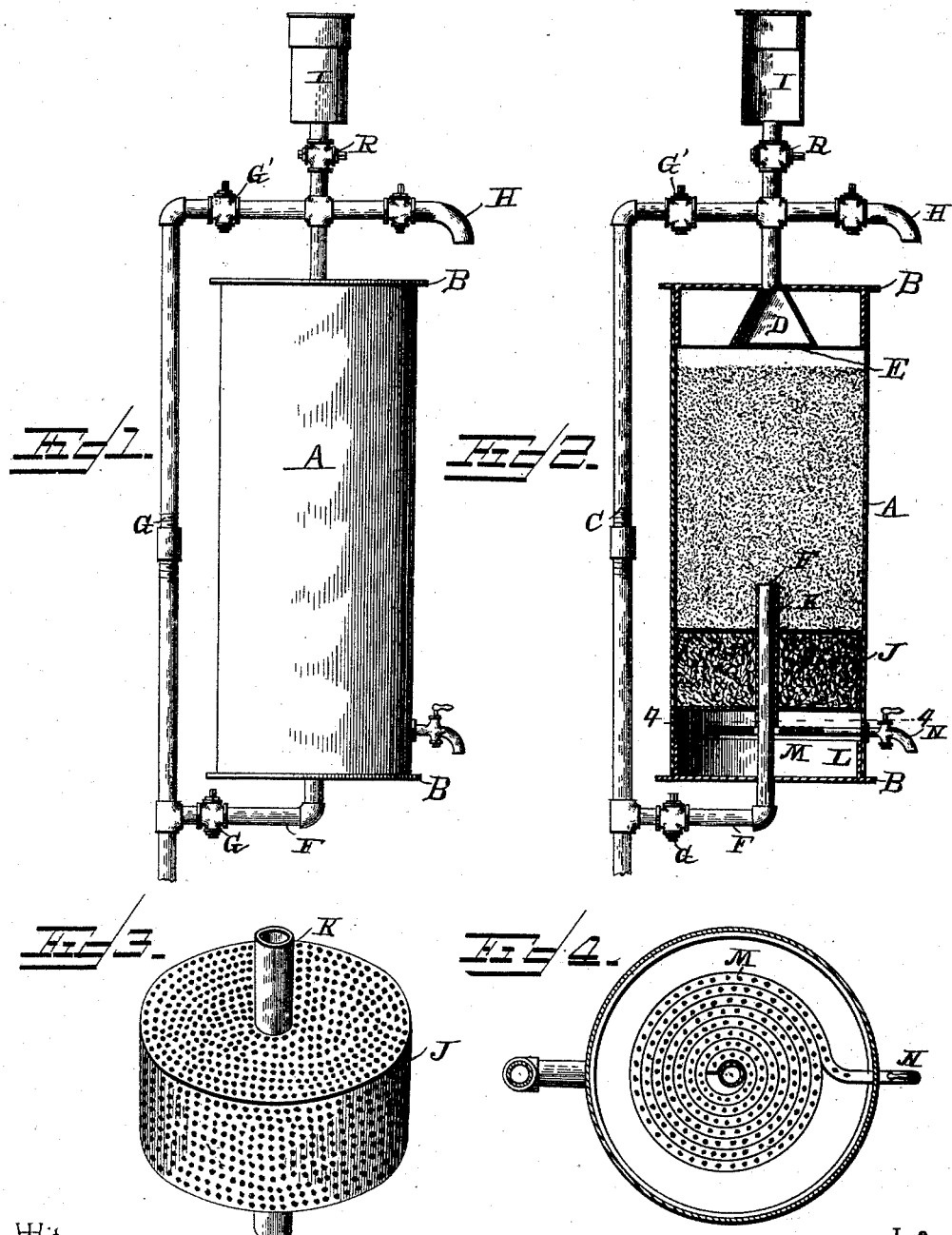
Witnesses
W. E. Schneider
D. P. Holhaupter
Inventor
J. M. Morgan.
By his Attorneys,
C. A. Snow & Co.

UNITED STATES PATENT OFFICE.

JOHN MARION MORGAN, OF SALISBURY, NORTH CAROLINA.

FILTER.

SPECIFICATION forming part of Letters Patent No. 489,084, dated January 3, 1893.

Application filed June 14, 1892. Serial No. 436,705. (No model.)

*To all whom it may concern:*

Be it known that I, JOHN MARION MORGAN, a citizen of the United States, residing at Salisbury, in the county of Rowan and State of North Carolina, have invented a new and useful Filter, of which the following is a specification.

This invention relates to filters; and it has for its object to provide an improvement in filters whereby the many impurities of the water are extracted therefrom, while at the same time the water is supplementally purified after the extraction of such visible impurities as are generally held in suspension in unfiltered water.

To this end the main and primary object of the invention is to generally improve upon the construction of filters adapted to be connected in the line of piping for water distribution and also to provide means whereby the filter can be easily cleaned.

With these and many other objects in view which will readily appear as the nature of the invention is better understood, the same consists in the novel construction, combination and arrangement of parts hereinafter more fully described, illustrated and claimed.

In the accompanying drawings;—Figure 1 is a side elevation of a filter constructed in accordance with this invention. Fig. 2 is a vertical sectional view of the same. Fig. 3 is a detail in perspective of the cylindrical purifying box. Fig. 4 is a horizontal sectional view on the line 4—4 of Fig. 2.

Referring to the accompanying drawings;— A, represents the filter cylinder having the top and bottom inclosing caps B, which may be fitted into the cylinder so as to be capable of being removed if found necessary or desirable. A main water supply pipe C extends from a suitable point of attachment with the unfiltered water supply, and passes into the top inclosing cap of the cylinder and terminates within said top in a flared or conical inlet funnel D, inclosed at its lower open end by the strainer E, which serves to collect the larger particles of sediment in the water before the same passes into the body of the filter. Connected with the pipe C adjacent to the lower end of the cylinder is the branch wash pipe F extending therefrom through the bottom inclosing head or cap of the cylinder and projecting therein a suitable distance or height for the purposes to be described. The said branch wash pipe is provided with a cock G, which is designed to be closed while the filter is in operation, and the cock G' located in the main supply pipe, is open, while on the other hand when the filter is being washed, the cock G', is closed and the cock G, is open, to allow the water to pass in at the bottom of the cylinder. A valved waste pipe H is connected with the portion of the supply pipe entering the top of the cylinder and is designed to be open when the water is passing at the bottom thereof to flush and wash the filter. Supported above the portion of the supply pipe entering the top of the cylinder is a supplemental alum pipe or cylinder I the contents from which being controlled by the cock R located in the short pipe connecting the tank with the supply pipe, so that at the proper time and at regular intervals the alum water may be allowed to flow into the cylinder to assist in the purification of the water. Removably mounted within the cylinder A and supported near the lower end thereof is the closed cylindrical perforated purifying box J, snugly fitting the interior bore of the cylinder and provided with a central tube K, fitting over the inner projecting end of the branch wash pipe F, extending within the bottom of the cylinder, so that the said box is not only held in position within the cylinder, but also allows the said pipe to extend to the top and slightly above the plane of the same, so that the water therefrom can be passed directly through the filtering material above said box. The portion of the cylinder between the top of said purifying box and the top inlet is filled with sand or other suitable filtering material through which the unfiltered water must first pass, while the box J is filled with iron filings so that the filtered water after passing through the main filtering strata is subjected to additional filtration besides being thorougly purified before being drawn from the cylinder.

A small filtered water chamber or space L, is left in the bottom of the cylinder below the perforated box J, and in such chamber directly under the bottom of said box is arranged the perforated horizontal discharge coil M. The said horizontal perforated discharge coil M comprises a number of coils of the same pipe which projects through the side of the cylinder and terminates in a faucet N, from which the filtered water is drawn at the proper time. It will be readily seen that the perforated discharge coil not only accommodates a quantity of water always ready to be drawn off, but also further acts as a strainer to prevent any sediment which may have worked its way through, from being drawn off. As before referred to, by manipulating the cocks as described, water can be passed up through the filtering material above the top of the box so as to thoroughly wash, cleanse and loosen up the same, thence through the upper strainer to carry off all the impurities collected thereby.

It is thought that the construction, and operation of this filter are now apparent without further description.

Having thus described my invention, what I claim and desire to secure by Letters Patent is;—

1. In a filter, the cylinder open at both ends, top and bottom caps removably inclosing the ends of the cylinder, a valved supply pipe entering the top cap of the cylinder, a valved branch wash pipe connected with said supply pipe and projecting through the bottom cap of the cylinder a distance into the same, a cylindrical perforated purifying box removably mounted upon the inner end of said wash-pipe, which latter projects slightly above the plane of the box, said box inclosing therebetween and the bottom cap of the cylinder a filtered water chamber, filtering material within said box, a suitable filtering strata filling the cylinder above said box and the inner terminal of the wash-pipe, and a horizontal discharge coil arranged in the filtered water chamber at the bottom of the cylinder, substantially as set forth.

2. In a filter, the cylinder, the valved supply pipe entering the top of the cylinder and terminating in a flared strainer, the valved wash pipe projecting within the bottom of the cylinder, a cylindrical perforated purifying box having a central tube removably fitting over the projecting end of said wash pipe near the bottom of the cylinder and containing suitable purifying material, a filtering strata filling the cylinder above said box, and a horizontal perforated discharge coil arranged within the cylinder between the bottom thereof and the bottom of said purifying box, substantially as set forth.

In testimony that I claim the foregoing as my own I have hereto affixed my signature in the presence of two witnesses.

JOHN MARION MORGAN.

Witnesses:
J. M. MONROE,
H. N. WOODSON.